(12) United States Patent
Ikejiri et al.

(10) Patent No.: US 8,808,087 B2
(45) Date of Patent: Aug. 19, 2014

(54) GAME DEVICE, GAME CONTROL METHOD, AND GAME CONTROL PROGRAM

(75) Inventors: Daisaku Ikejiri, Tokyo (JP); Masashi Muramori, Yokohama (JP); Toshiyuki Kuwabara, Yokohama (JP); Kentarou Nakazawa, Yokohama (JP)

(73) Assignees: Sony Corporation, Tokyo (JP); Sony Computekr Entertainment Inc., Tokyo (JP)

( * ) Notice: Subject to any disclaimer, the term of this patent is extended or adjusted under 35 U.S.C. 154(b) by 902 days.

(21) Appl. No.: 12/528,150

(22) PCT Filed: Oct. 9, 2007

(86) PCT No.: PCT/JP2007/001092
§ 371 (c)(1),
(2), (4) Date: Oct. 27, 2009

(87) PCT Pub. No.: WO2008/114326
PCT Pub. Date: Sep. 25, 2008

(65) Prior Publication Data
US 2010/0099473 A1    Apr. 22, 2010

(30) Foreign Application Priority Data

Feb. 22, 2007 (JP) .................... 2007-043012
Feb. 22, 2007 (JP) .................... 2007-043014
Mar. 22, 2007 (JP) .................... 2007-075327
Mar. 22, 2007 (JP) .................... 2007-075329
Apr. 24, 2007 (JP) .................... 2007-114894

(51) Int. Cl.
*A63F 13/10* (2006.01)
*A63B 69/36* (2006.01)

(52) U.S. Cl.
CPC ............. *A63B 69/36* (2013.01); *A63F 13/10* (2013.01)
USPC .............. 463/31; 463/3; 463/37; 463/43

(58) Field of Classification Search
CPC .............. A63F 13/00; A63F 2300/306; A63F 2300/638; A63F 2300/6669; A63F 2300/6045; A63F 2300/8011; A63B 69/36
USPC ....................................... 463/37, 43
See application file for complete search history.

(56) References Cited

U.S. PATENT DOCUMENTS 7,023,434 B2 * 4/2006 Takahashi et al. ............ 345/419
7,270,601 B2 * 9/2007 Takahashi et al. ............. 463/3

(Continued)

FOREIGN PATENT DOCUMENTS

JP    6-139332     5/1994
JP    2002-233662  8/2002

(Continued)

OTHER PUBLICATIONS

Super Swing Golf, Wii, released Dec. 12, 2006; pp. 1-23.*

(Continued)

*Primary Examiner* — David L Lewis
*Assistant Examiner* — Shauna-Kay Hall
(74) *Attorney, Agent, or Firm* — Katten Muchin Rosenman LLP

(57) ABSTRACT

A game device is provided with an input reception unit that receives an operating input from a player, a control unit that controls a game in accordance with the timing of the operating input, and a screen generation unit that displays a screen of the game, wherein the screen generation unit generates and displays a screen of a player's character in the motion of making a shot, and a power determination unit and an impact determination unit determine the power or impact of a shot in accordance with the degree of the progress of the motion of making the shot at the point when the operating input is received.

18 Claims, 14 Drawing Sheets

(56) References Cited

U.S. PATENT DOCUMENTS

| | | | |
|---|---|---|---|
| 7,297,056 B2* | 11/2007 | Takahashi et al. ............... | 463/3 |
| 7,582,010 B2* | 9/2009 | Takahashi et al. ............... | 463/3 |
| 8,033,914 B2* | 10/2011 | Yoshikawa et al. .............. | 463/36 |
| 2004/0176165 A1* | 9/2004 | Takahashi et al. .............. | 463/36 |
| 2004/0180709 A1* | 9/2004 | Takahashi et al. ............... | 463/3 |
| 2004/0214623 A1* | 10/2004 | Takahashi et al. ............... | 463/2 |

FOREIGN PATENT DOCUMENTS

| | | |
|---|---|---|
| JP | 2003-71131 | 3/2003 |
| JP | 2004-113562 | 4/2004 |
| JP | 2004-329791 | 11/2004 |
| JP | 2005-267006 | 9/2005 |

OTHER PUBLICATIONS

International Search Report dated Jan. 15, 2008, from the corresponding International Application.
International Preliminary Report on Patentability and Written Opinion of the International Searching Authority dated Aug. 26, 2009, from the corresponding International Application.
Oh! PC, Aug. 1, 1998, vol. 17, No. 4, p. 332.
Minnano Golf Online Kaisetsusho, Sony Computer Entertainment Inc., Dec. 25, 2003, pp. 20 to 21.
Notification of Reason(s) for Refusal dated Jun. 7, 2011, from corresponding Japanese Application No. 2007-114894.
Notification of Reason(s) for Refusal dated Jun. 7, 2011, from corresponding Japanese Application No. 2007-075327.

* cited by examiner

GAME DEVICE, GAME CONTROL METHOD, AND GAME CONTROL PROGRAM

TECHNICAL FIELD

The present invention relates to game control techniques, and particularly to game devices, game control methods, and game control programs for controlling golf games.

BACKGROUND ART

Games where characters are operated to play golf have gained popularity. Golf is a fairly popular sport in the real world with many players of all ages.

DISCLOSURE OF INVENTION

Technical Problem

There are many golf games in the marketplace. However, since the style of playing is inherently simple, is very difficult to provide a unique feature. Thus, most of the games do not vary from one another. The development of a golf game that has new and interesting features is desirable.

In this background, a purpose of the present invention is to provide game control techniques with high entertainment value.

Means for Solving the Problem

An embodiment of the present invention relates to a game control program product. The game control program product comprises: a module operative to receive an operating input from a player; a module operative to control a game in which a player's character plays golf in accordance with the operating input; and a module operative to display a screen of the game, wherein the module operative to display the screen generates and then displays a screen in which the player's character is in the motion of making a shot, and the module operative to control the game determines the power or impact of the shot in accordance with the degree of the progress of the motion of making the shot at the time of the receipt of the operating input.

Optional combinations of the aforementioned constituting elements, and implementations of the invention in the form of methods, apparatuses, and systems may also be practiced as additional modes of the present invention.

Advantageous Effects

The present invention can provide a game control technique with high entertainment value.

BRIEF DESCRIPTION OF DRAWINGS

Embodiments will now be described, by way of example only, with reference to the accompanying drawings that are meant to be exemplary, not limiting, and wherein like elements are numbered alike in several figures, in which.

Figure 1:
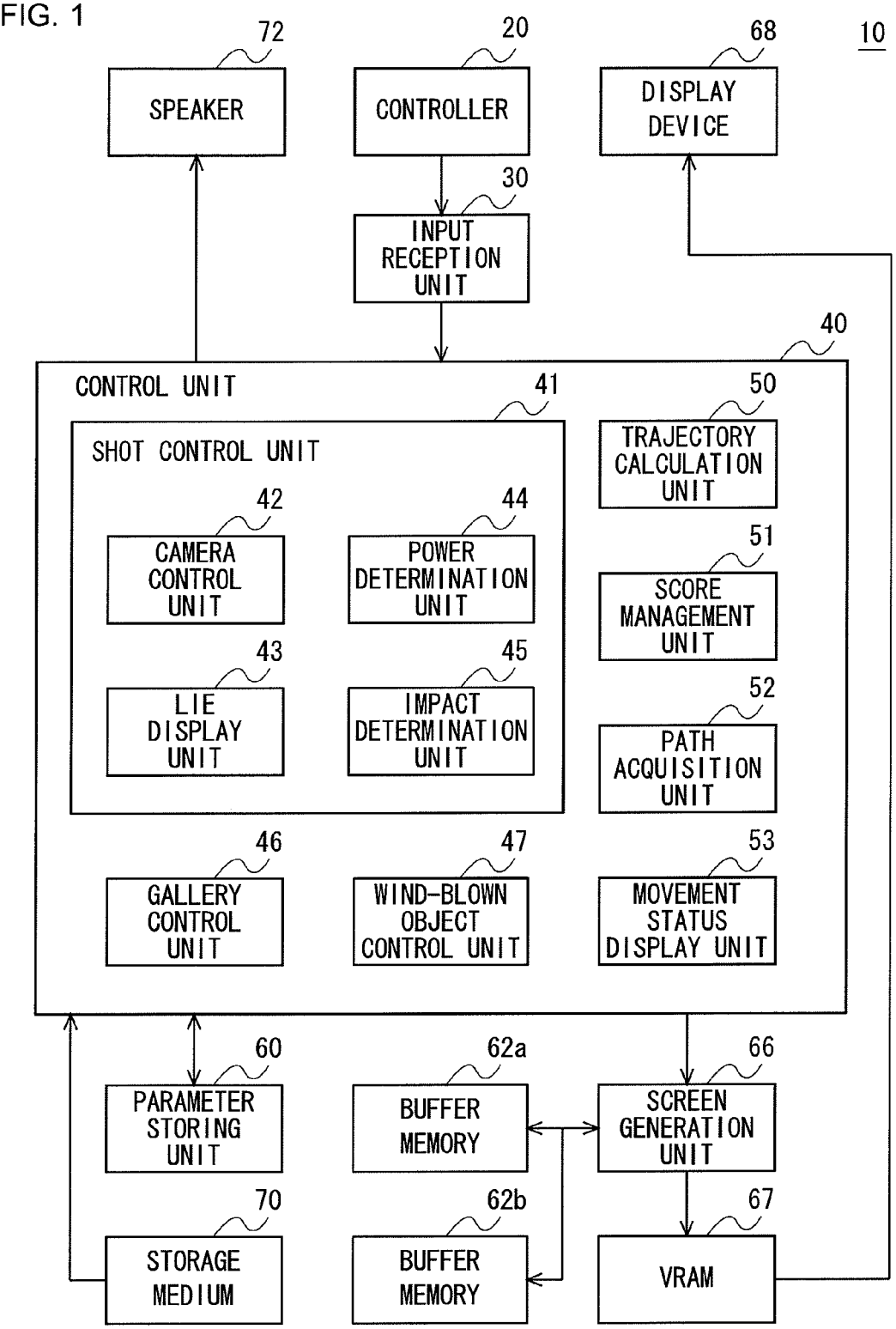
FIG. 1 is a diagram showing the configuration of a game device according to the embodiment.

EXPLANATION OF REFERENCE 10 game device
20 controller
30 input reception unit
40 control unit
41 shot control unit
42 camera control unit
43 lie display unit
44 power determination unit
45 impact determination unit
46 gallery control unit
47 wind-blown object control unit
50 trajectory calculation unit
51 score management unit
52 path acquisition unit
53 movement status display unit
60 parameter storing unit
62a, 62b buffer memory
66 screen generation unit
67 VRAM
68 display device
70 storage medium
72 speaker

BEST MODE FOR CARRYING OUT THE INVENTION

The game device according to the embodiment allows for the realization of a game where a player's character that is maneuvered by a player plays a game involving a ball that is hit. In the embodiment, the explanation is made by using golf as an example.

FIG. 1 shows the configuration of a game device 10 according to the embodiment. The game device 10 is provided with a controller 20, an input reception unit 30, a control unit 40, a parameter storing unit 60, buffer memory 62a and buffer memory 62b, a screen generation unit 66, a VRAM 67, a display device 68, a storage medium 70, and a speaker 72. These configurations are implemented in hardware component by any CPU of a computer, memory, or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

The input reception unit 30 receives a control signal input from the controller 20 operated by a player. The control unit 40 retrieves and executes a program from the storage medium 70 in which the golf game program is stored and, based on operating input from the player received by the input reception unit 30, progresses through the golf game while controlling the movement of a player's character that functions as a golf player in the ethos of the game. The parameter storing unit 60 stores parameters necessary for the progress of the golf game. The screen generation unit 66 generates a screen for the game controlled by the control unit 40 and displays the screen in the display device 68 via the VRAM 67. The speaker 72 outputs the audio of the game that is controlled by the control unit 40.

The shot control unit 41 controls a shot made by the player's character. The shot control unit 41 is provided with a camera control unit 42, a lie display unit 43, a power determination unit 44, and an impact determination unit 45.

Figure 2:
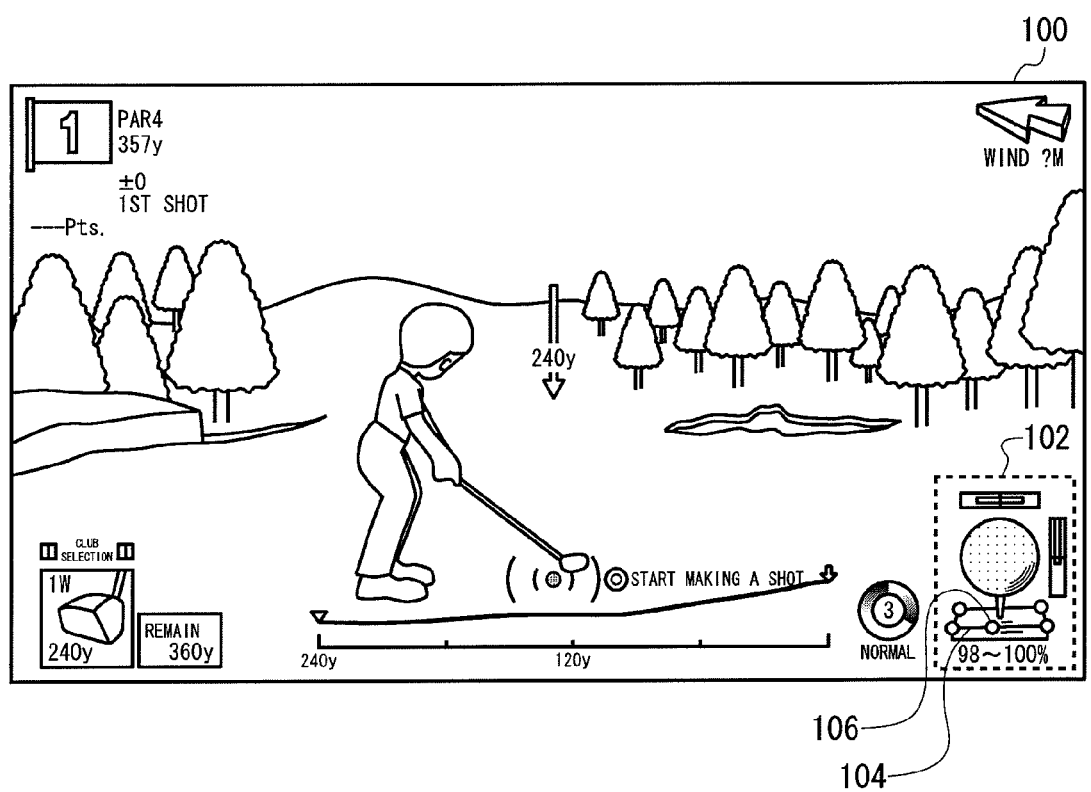
FIG. 2 is a diagram showing an example of a game screen when a player's character makes a shot.

FIG. 2 shows an example of a game screen when a player's character makes a shot. A screen 100 displays an image showing the rendered land features of a hole currently in play, an image where the player's character is viewed from behind, and an area 102 showing the condition of the lie. In the screen, the player determines the power and the impact of the shot by operating the controller 20 so that the player's character makes a shot.

The camera control unit 42 controls the viewpoint position and the line of sight of a camera when the screen generation unit 66 generates a game screen. When generating a game screen of the player's character making a shot, the camera control unit 42 sets the viewpoint position behind the player's character and the line of sight in the direction toward the player's character as default setting. The player can change the viewpoint position and the line of sight by operating the controller 20 so as to check the land features of the hole or to determine the direction for making a shot, the distance, etc. As described hereinafter, the camera control unit 42 changes the viewpoint position and the line of sight of the camera in accordance with the operating input from the player and notifies the screen generation unit 66 accordingly.

The lie display unit 43 displays the condition of the ground at the contact point where a ball rests when the player's character makes a shot. In this case, the lie display unit 43 shows the inclination state of the ground by displaying an object moving from higher ground to lower ground. For example, the lie display unit 43 may display a perspective view of the square-cut ground 104 at the contact point where the ball rests, which is viewed obliquely from above, and displays a gauge bubble 106 moving on the sides of the square as shown in FIG. 2. The velocity of the gauge bubble 106 is set so as to become faster as the inclination of the ground 104 becomes larger and to become slower as the inclination becomes smaller in this case. The velocity of the gauge bubble 106 may be changed so that the condition of the lie at the contact point where the ball rests is reflected. For example, the velocity of the gauge bubble 106 may be changed for the fairway, rough, bunkers, cart path, etc. The velocity of the gauge bubble 106 may also be determined in further consideration of the condition of the grass grain and the grass condition of a green. When the player changes the viewpoint position and the line of sight of the camera to display the area around the landing site or reaching point of the ball so that the player can line up a shot or putt, a screen may be displayed along with a grid for a predetermined area around the landing site or reaching point of the ball, and a gauge bubble flows along the grid. The velocity of the gauge bubbles may also be determined in accordance with the land features of the area, the condition of the lie, grass grain, etc. in this case. When the velocity is too fast or too slow, the gauge bubble 106 is difficult to be visually identified. Thus, the upper limit and the lower limit of the velocity may be specified to be, for example, the velocity of the gauge bubble making a circle in 0.5 seconds and the velocity of the gauge bubble making a circle in 10 seconds, respectively. In this manner, not only the horizontal inclination but also the inclination of the depth in the screen can easily be visually expressed. Thus, the player can get a clear grasp of the condition of the lie and accordingly can consider that factor when making a shot. As will hereinafter be described in detail, in the golf game of the embodiment, the trajectory of the hit ball is calculated by a physical calculation in consideration of the inclination angle of the contact area of the ball; thus, it is particularly important to display the inclination angle of the contact area of the ball in an easy-to-understand manner.

The power determination unit 44 determines the power of a shot made by the player's character. Upon the receipt of the operating input from the controller 20 to which the request to start making a shot is assigned, the power determination unit 44 ensures that the screen generation unit 66 generates a screen in which the player's character is swinging back to make a shot and the display device 68 will display accordingly. The player enters the operating input to which the request for determining the power is assigned by using the degree of the progress of the movement of the player's character swinging back as an indicator. The power determination unit 44 determines the power of making a shot in accordance with the degree of the progress of the movement of the player's character making a shot at the time of the receipt of the operating input for determining the power. The power determination unit 44 notifies the trajectory calculation unit 50 of the determined power.

The power determination unit 44 determines the power of making a shot based on the ratio between the time required for the movement of the backswing to reach full swing and either the time it takes from the start of the backswing until the receipt of the operating input for determining the power or the frame number of a display screen. For example, the power at the time of the receipt of the operating input may be determined by an internal division by specifying the power at the time of the start of the backswing as zero percent and the power at the time that the backswing reaches the top of the swing as 100 percent. When the time required for a full swing is two seconds and the operating input is received 1.6 seconds after the start of the backswing, the power may be specified as 80 percent. When the frame number for displaying the movement of a full swing is 100 frames and the operating input is received 70 frames after the start of the backswing, the power may be specified as 70 percent. When the power reaches a predetermined value, for example, 50 percent or 100 percent, the power determination unit 44 may display the information accordingly or may change a display mode of a clubhead as an indicator for a player to adjust his/her timing.

Figure 3A:
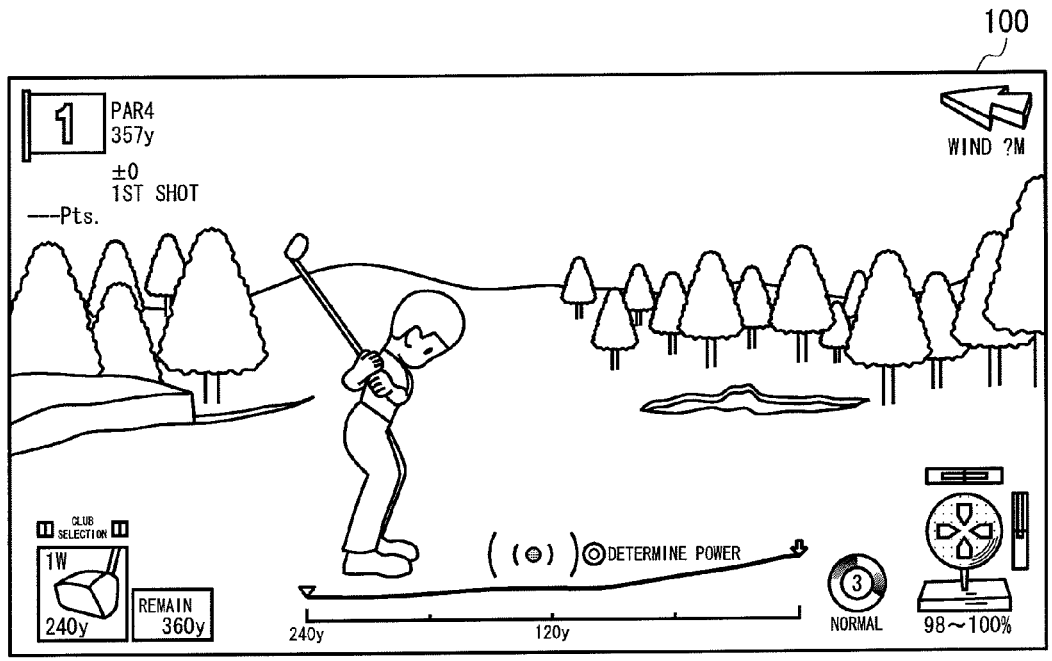
FIGS. 3A and 3B are diagrams showing examples of game screens when a player's character is in the backswing motion.
Figure 3B:
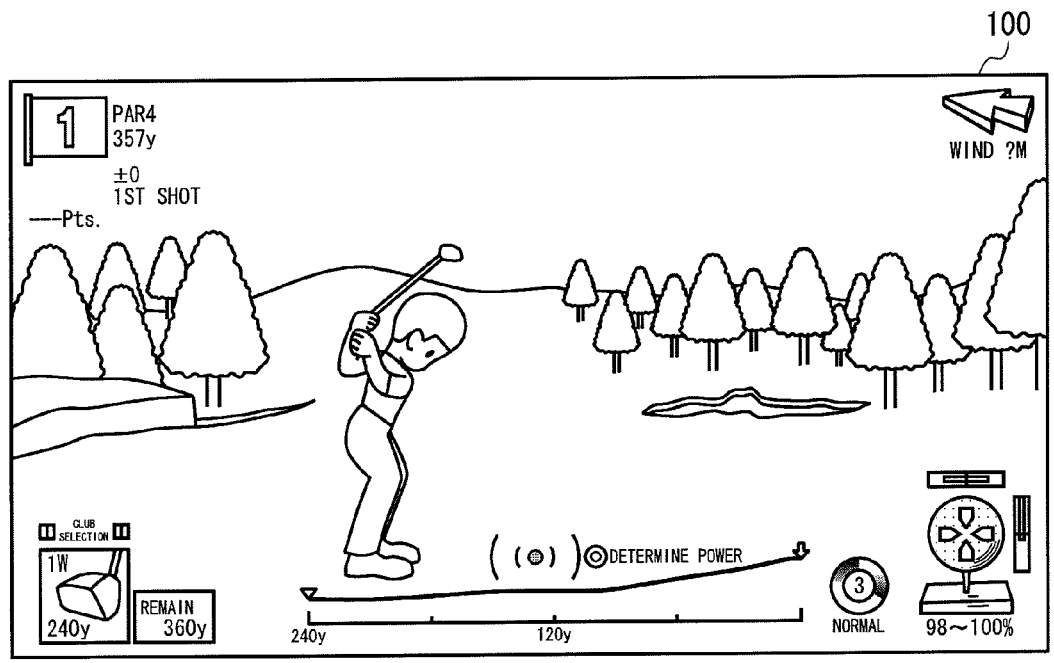

FIGS. 3A and 3B show examples of game screens when a player's character is in the backswing motion. FIG. 3A shows the state when half of the time required from the start of the player's character's backswing to the time required to reach a full swing has passed. If the operating input is received from the player at this point, the power determination unit 44 determines the power of making a shot as 50 percent. FIG. 3B shows the state when the player's character reaches the top of the swing. If the operating input is received from the player at this point, the power determination unit 44 determines the power of making a shot as 100 percent.

When the operating input is received during the backswing, the power determination unit 44 may stop the backswing and change to a downswing at that point or may display a full swing by showing the backswing continuously after the power is determined. When reaching the top of the swing without receiving an operating input during the backswing, the power determination unit 44 may determine the swing as a practice swing and a shot may not be hit. Otherwise, the power may be set to fall during the downswing, and the power determination unit 44 may keep waiting to receive an operating input and may determine the power in accordance with the time required from the start of the downswing until the operating input is received.

The power determination unit 44 may set a full swing not to produce the power of 100 percent depending on the condition of a lie, the land features of a bunker when hitting a bunker shot, the stance of a player's character, etc. In the case of hitting an approach shot, the player's character may be set not to make a full swing but to make only a half swing. Even in such a case, by providing a feature for a player's character to make a practice swing as described above, a player can first check the relationship between the swing and the power by allowing the player's character to make a practice swing and then make a shot.

Conventionally, there are many examples where, in determining the power of making a shot in a golf game, a gauge or the like that shows the status of the power as an indicator is displayed while a player's character stands still. In the embodiment, a user interface where the motion of a shot is used as an indicator is achieved by generating the motion of a player's character making a shot at a high frame rate. This allows for the realization of a golf game with a high sense of reality. A technique used for generating the motion of a shot at a high velocity and at a high frame rate and displaying accordingly will be described in detail hereinafter.

When the degree of the progress of the backswing motion of the player's character making a shot reaches a predetermined value, the power determination unit 44 outputs a sound indicating that information accordingly to the speaker 72. The power determination unit 44 may set multiple predetermined values and output different sounds, respectively. For example, the sounds with notes, C, D, E, F and G, of a musical scale may be output when the power reaches 20 percent, 40 percent, 60 percent, 80 percent, and 100 percent, respectively.

Figure 14A:
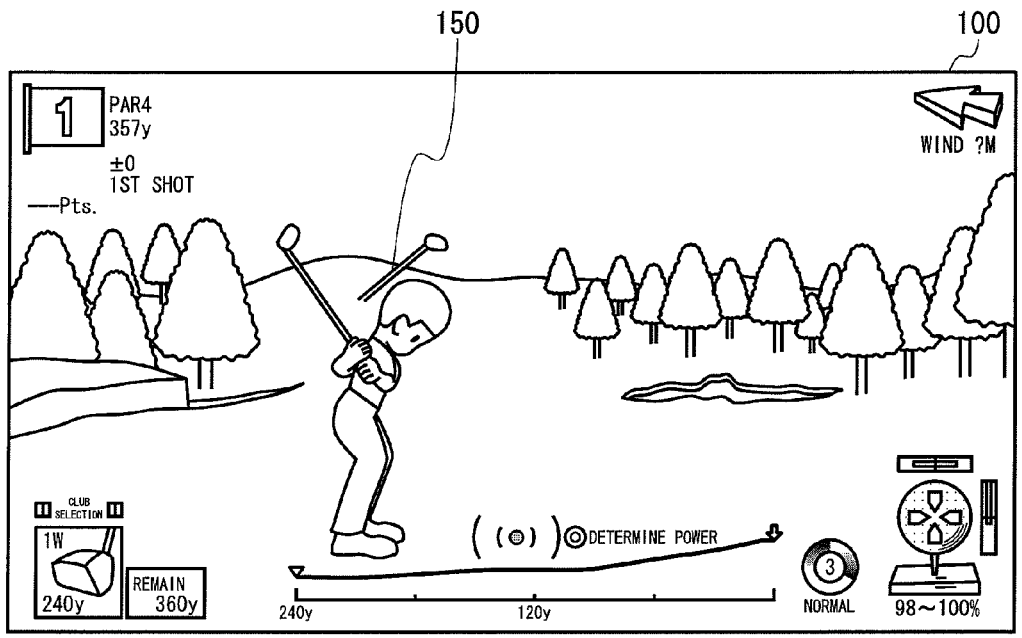
FIGS. 14A and 14B are diagrams showing examples of game screens when a player's character is in the backswing motion.
Figure 14B:
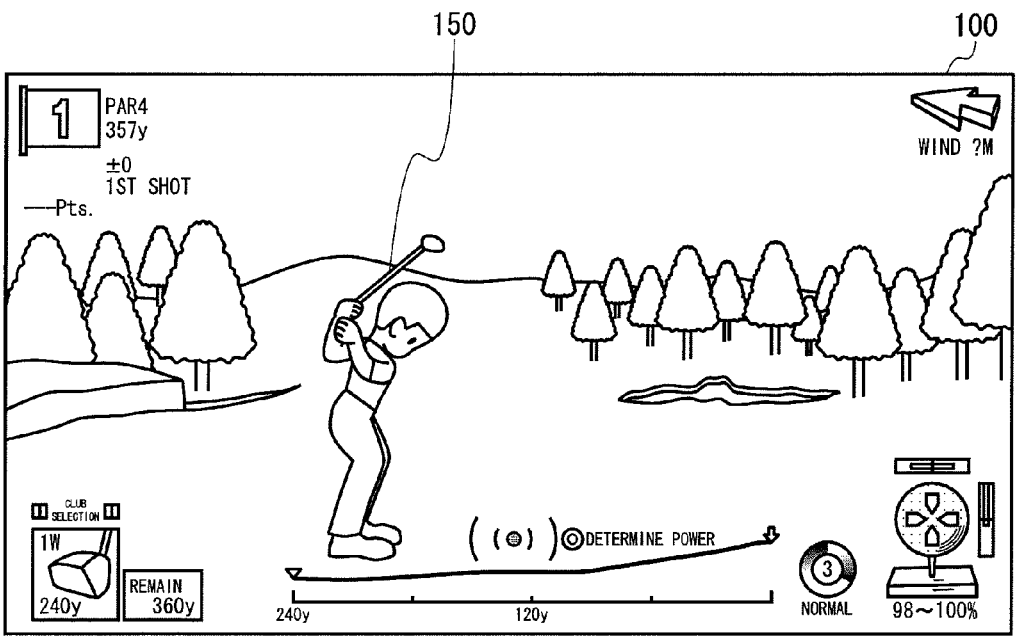

The power determination unit 44 may display an indicator showing the position of a club on the trajectory of the motion of the player's character making a shot when the degree of the progress of the motion of the player's character making a shot reaches a predetermined value. For example, as shown in FIG. 14a, a club 150 at the position of the top of the swing during full swing may be displayed as an indicator. This allows the player to adjust timing of entering operating input while comparing the position of a club being used by the player's character in making a shot with the position of a club when the power of a shot is 100 percent. Since an indicator is displayed on the trajectory of a swing, the player can visually identify both the movement of the player's character's swing and the indicator at the same time. FIG. 14B shows the state when the player's character reaches the top of the swing. When an operating input from the player is received at the point when the club the player's character is swinging overlaps with the club 150 that is displayed as an indicator, the power determination unit 44 determines the power of a shot as 100 percent. The power determination unit 44 may display multiple clubs as indicators. For example, clubs at the power of 50 percent and 100 percent may be displayed as indicators. For example, arbitrary graphics or character strings instead of clubs may be displayed as indicators.

Figure 4:
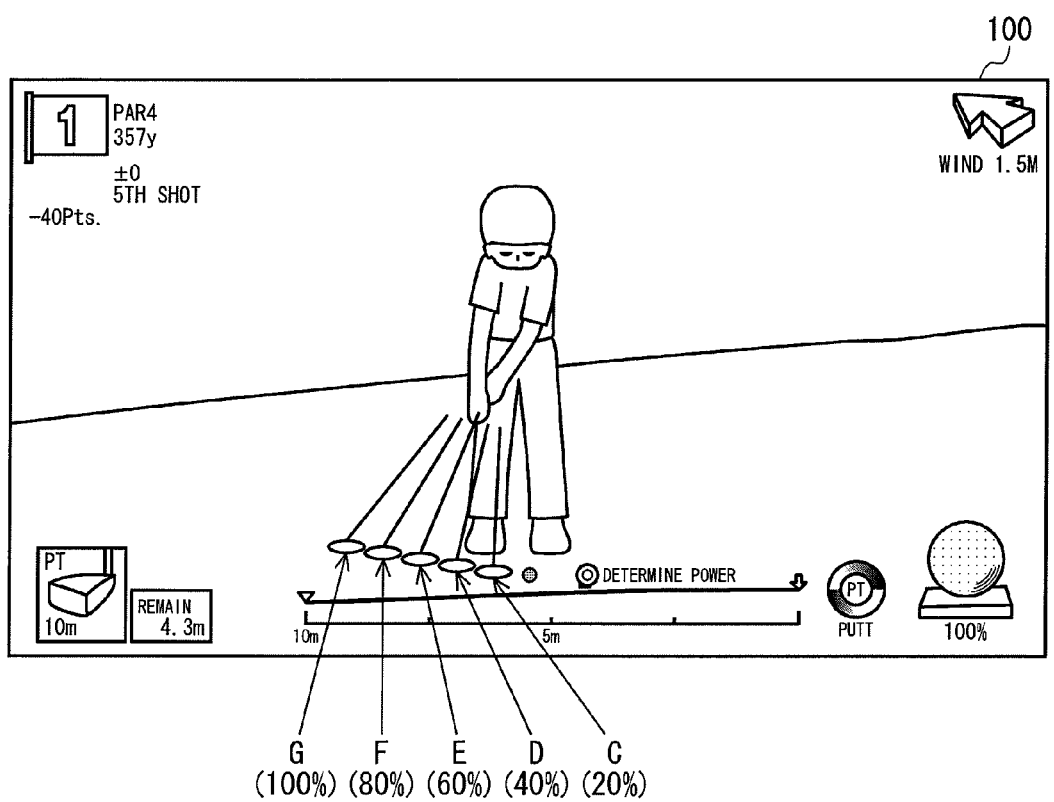
FIG. 4 is a diagram showing an example of a game screen when a player's character is in the backswing motion.

FIG. 4 shows an example of a game screen when a player's character is in the backswing motion. How much the player's character should swing back before putting is hard to determine beforehand. Thus, it is hard for the player to time the entering of operating input for determining the power. Therefore, the power determination unit 44 outputs the sounds to the speaker 72 with notes C, D, E, F, and G of a musical scale when the power reaches 20 percent, 40 percent, 60 percent, 80 percent, and 100 percent, respectively. This allows for the realization of a user-friendly user interface since the player can time the entering of operating input for determining the power of a shot according to the sounds generated from the speaker 72.

The camera control unit 42 instructs the screen generation unit 66 to change the viewpoint position or the line of sight in generating a screen in accordance with the instruction input from the player while the game screen is displayed where the player's character is making a shot. Depending on the condition of the land features or obstacles around a ball, it may be hard to see the backswing motion of the player's character. In this case, it is hard for the player to time the entering of operating input for determining the power. Thus, the camera control unit 42 changes the viewpoint position or the line of sight of the camera so that the backswing motion of the player's character can be easily seen.

Figure 5A:
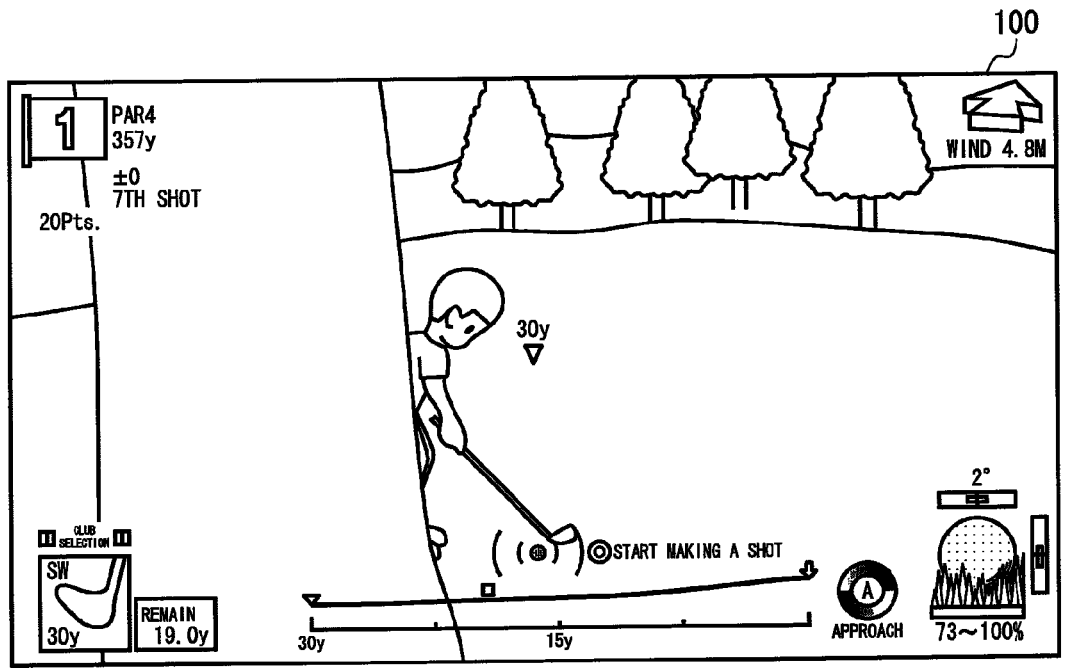
FIGS. 5A and 5B are diagrams showing examples of game screens when a player's character is in the backswing motion.
Figure 5B:
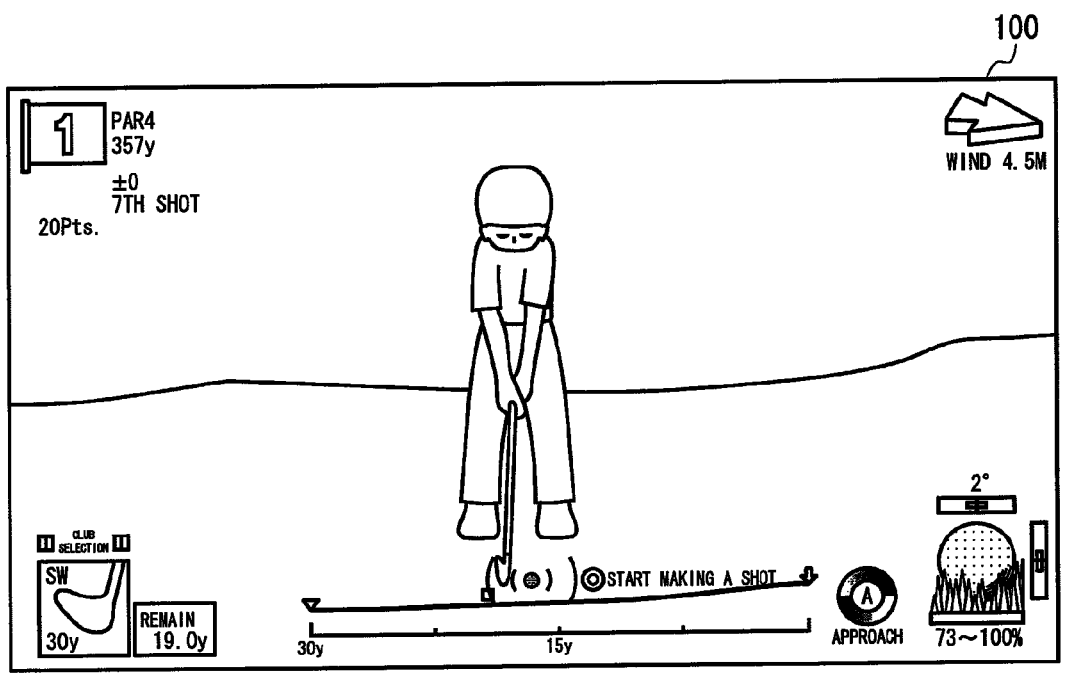

FIGS. 5A and 5B show examples of game screens when a player's character is in the backswing motion. As shown in FIG. 5A, the backswing motion may not be seen well due to an obstacle such as a tree on the screen in which the player's character is viewed from behind. In this case, the player enters operating input to switch the viewpoint position or the line of sight of the camera by using, for example, a direction key of the controller 20. As shown in FIG. 5B, the camera control unit 42 changes the viewpoint position or the line of sight of the camera in accordance with the operating input from the player so that the backswing motion of the player's character can be easily seen in the screen. As shown in FIG. 5B, setting the viewpoint position on the side of the player's character allows the progress of the backswing motion of the player's character to be easily seen and allows for the realization of a user-friendly user interface.

The camera control unit 42 may automatically move the viewpoint position of the camera to the position where the backswing motion of the player's character can be easily seen. Particularly when the player's character makes a putt, the motion of the backswing is small, and the movement of the putter is hard to be seen from behind the player's character. Thus, the camera control unit 42 may switch the viewpoint position of the camera to the position on the side of the player's character as shown in FIG. 4.

When receiving the operating input for determining the power of the player's character making a shot, the power determination unit 44 may display the trajectory or arrival position of a ball hit at the power at that moment. As described previously, the adjustment of timing, in particular, making a putt by using the motion of the backswing is difficult, and the difficulty may be unnecessarily increased even for a short putt. Thus, displaying the trajectory or arrival position of a ball allows the player to easily time the entering of the operating input for determining the power.

Figure 6:
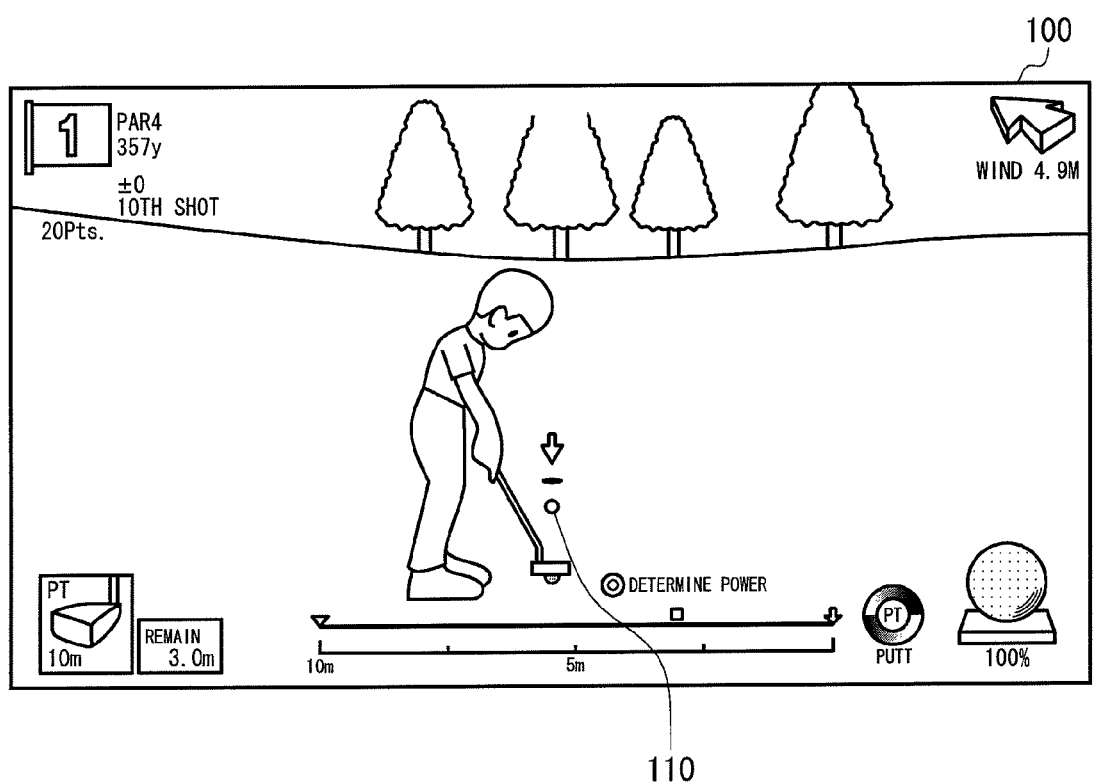
FIG. 6 is a diagram showing an example of a game screen when a player's character is in the backswing motion.

FIG. 6 shows an example of a game screen when a player's character is in the backswing motion. When the distance from the current position of a ball to the cup is shorter than a predetermined value, for example, 5 meters, the power determination unit 44 may display a circle 110 that shows the arrival position of the ball putted at the power at that moment. The arrival position when the ball putted at the power at that moment rolls in a linear manner on a flatland may be displayed without taking land features, grass grains, etc., into account. This allows for the assistance for entering the operating input for putting, which is just enough so that the difficulty is not lowered too much. For the long-distance putting, the difficulty is set at high by not providing any assistance for the putting of, for example, 5 meters or more since the difficulty is also high in the real world. As the distance from the current position of a ball to the cup becomes longer, the power determination unit 44 may display the circle 110 in a lighter color. When the distance from the current position of a ball to the cup is shorter than a predetermined value, for example, 2.5 meters, the power determination unit 44 may display the circle 110. For the putting of less than 5 meters, the assistance is provided by displaying the circle 110 in a manner such that the color thereof gradually becomes lighter and the circle 110 eventually fades out until the distance to the arrival position becomes 2.5 meters, just enough so that the difficulty is not lowered too much. When the remaining distance to the cup is less than 2.5 meters, the operating input entered at the moment when the circle 110 overlaps the cup allows the ball to go in the cup if the land features and the grass grains do not have any effect. Thus, the player needs to finely adjust the timing in consideration of the land features and the grass grain from the ball to the cup.

The impact determination unit 45 determines the impact of a shot made by the player's character. After the power of a shot is determined by the power determination unit 44, the impact determination unit 45 ensures that the screen generation unit 66 generates a screen in which the player's character is down-swinging and the display device 68 will display accordingly. The player enters by the controller 20 the operating input to which the request for determining the impact is assigned, by timing the player's character hitting a ball by down-swinging. The impact determination unit 45 determines the impact of a shot in accordance with the time difference between the point when the player's character hits a ball by swinging down and the point when the operating input for determining the impact is received. The impact determination unit 45 notifies the trajectory calculation unit 50 of the determined impact. In this case, whether the timing is early or late may be expressed by, for example, placing a negative sign when the operating input is received before the impact reaches 100 percent and a positive sign when the operating input is received after the impact reaches 100 percent.

As an assistance for an indicator for timing, the impact determination unit 45 ensures the screen generation unit 66 generates a screen that includes a graphic that shrinks over time and becomes the smallest when the player's character hits a ball, in other words, when a shot can be made with the highest impact and ensures the display device 68 displays accordingly. The player can enter the operating input for determining the impact by further using the shrinking graphic as an indicator. The impact determination unit 45 may display a graphic having the position of the ball as a center or the center of gravity, and the graphic may shrink so as to converge toward the position of the ball. This allows for the realization of a user-friendly user interface since the player can operate while visually identifying both the player's character swinging down and the graphic shrinking.

The impact determination unit 45 may determine the impact at the time when the operating input is received by internal division by specifying the impact as 100 percent, for example, at the time when the player's character hits the ball, in other words, at the time when there is no time difference and the impact as a predetermined lower limit at the time when the time difference reaches a predetermined upper limit. As stated hereinafter, the trajectory calculation unit 50 corrects the flying distance, the direction, etc., so that the lower the value of the impact determined by the impact determination unit 45, the more the ball goes off from the targeted landing site. When the time difference exceeds the predetermined upper limit without receiving any operating input after the downswing by the player's character passes a ball, the impact determination unit 45 may determine that a practice swing is made so as to ensure that a shot is not made or may ensure that a shot is made by automatically setting the impact to the predetermined lower limit.

Figure 7A:
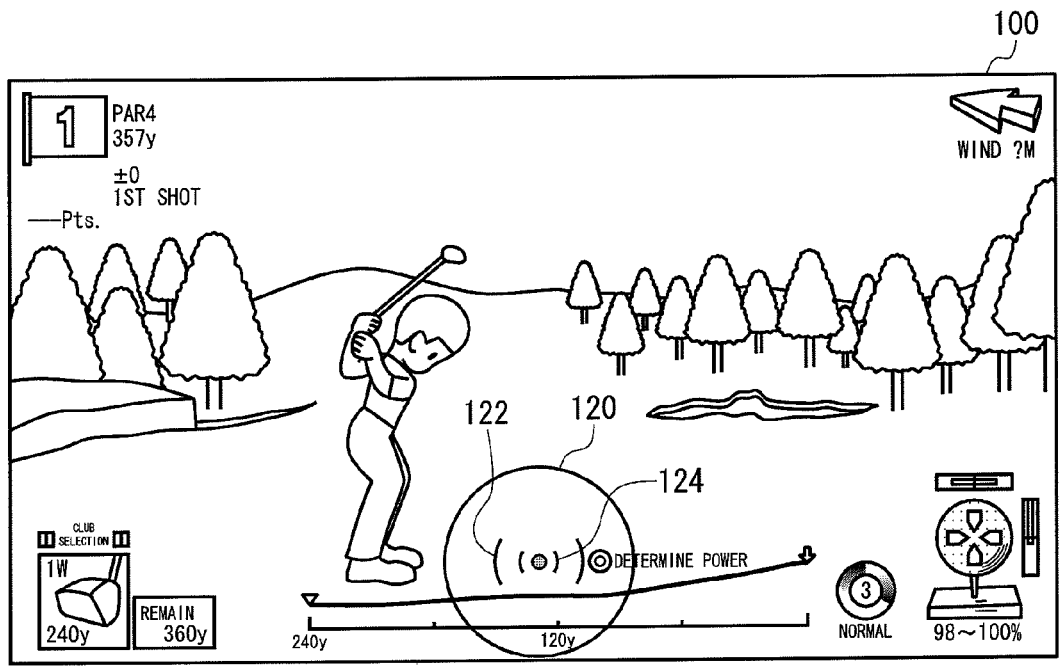
FIGS. 7A and 7B are diagrams showing example game screens when a player's character is in the downswing motion.
Figure 7B:
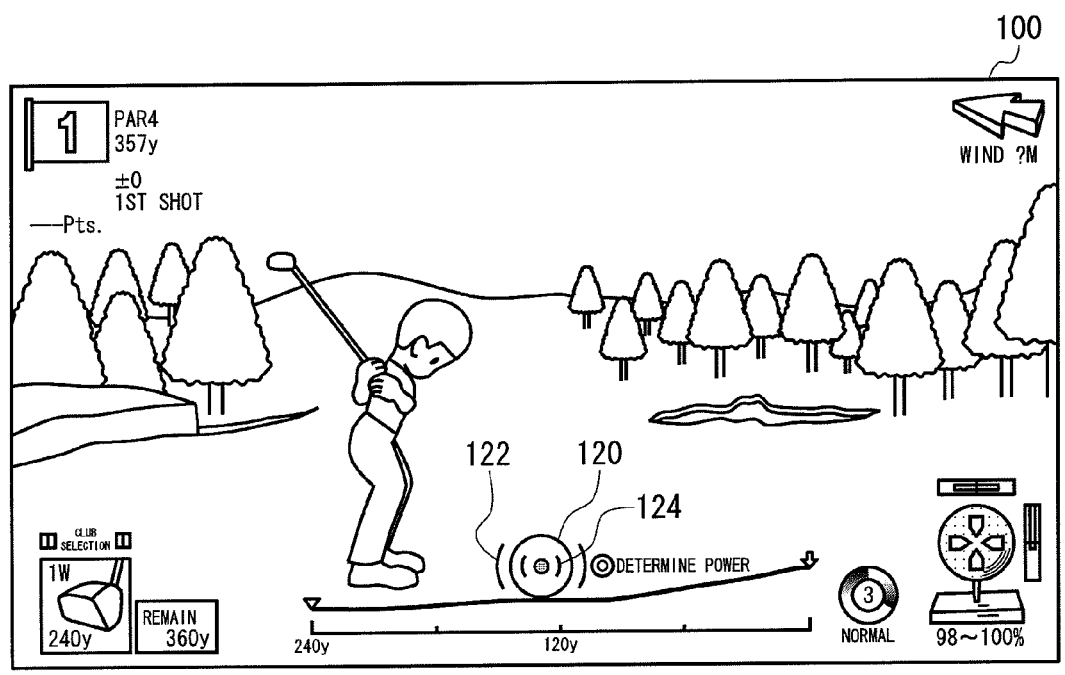

FIGS. 7A and 7B show examples of game screens when a player's character is in the motion of swinging down. FIG. 7A shows the state when the player's character starts the downswing. The impact determination unit 45 displays a circle 120 for assistance of the indicator for the timing. A graphic 122 is displayed showing the diameter of the circle 120 when the impact reaches the lower limit and a graphic 124 is displayed showing the diameter of the circle 120 when the impact reaches the upper limit, for example, 100 percent. When the operating input is received while the diameter of the circle 120 is larger than the diameter shown by the graphic 122, the impact determination unit 45 may set the impact to the predetermined lower limit. In this case, the trajectory calculation unit 50 may determine that a shot has been missed. When the operating input is received while the diameter of the circle 120 is smaller than the diameter shown by the graphic 124, the impact determination unit 45 may set the impact to the predetermined upper limit, for example, 100 percent. When the operating input is received while the diameter of the circle 120 is smaller than the diameter shown by the graphic 122 but larger than the diameter shown by the graphic 124, the impact determination unit 45 may set the impact to a value between the predetermined upper limit and the predetermined lower limit in accordance with the timing when the operating input is received. FIG. 7B shows the state right before the player's character hits a ball. The impact determination unit 45 shrinks the circle 120 so that the circle 120 becomes the smallest at the moment when the player's character hits the ball. When no operating input is received before the moment the player's character hits the ball, the impact determination unit 45 may expand the circle 120 thereafter. In this case, the impact may be set to the upper limit when the diameter of the circle 120 is smaller than the diameter shown by the graphic 124 and the impact may be set to the lower limit when the diameter of the circle 120 is larger than the diameter shown by the graphic 122. When no operating input is received even at the moment when the diameter of the circle 120 becomes larger than the diameter shown by the graphic 122, a shot may be made by automatically setting the impact to the lower limit. As another example, the impact determination unit 45 may set the impact to the lower limit when the diameter of the circle 120 is larger than the diameter shown by the graphic 122 and may set the impact to the upper limit when the diameter of the circle 120 is the same as the diameter shown by the graphic 124 while ensuring that the impact becomes larger as the diameter of the circle 120 becomes smaller. The impact may be set to be smaller gradually as the diameter of the circle 120 becomes smaller than the diameter shown by the graphic 124 thereafter.

As another example, the impact determination unit 45 may display both a graphic that moves right and left or up and down or on an arbitrary straight line or curved line with time and a gauge that shows the position of a graphic for the maximum impact, and both may be used as an indicator for a player to time the entering of operating input. The impact determination unit 45 may determine the impact or power of a shot in accordance with the angle, velocity, pressure, etc., of pressing down an analog stick on the controller 20.

The trajectory calculation unit 50 calculates the trajectory of a shot by a physical calculation based on the power and impact of a shot determined by the shot control unit 41 and on external factors such as the lie of the ball, a wind, and land features.

The trajectory calculation unit 50 reads out from parameter storing unit 60 the initial velocity and the loft angle that are set in advance in accordance with the club used to make a shot. The trajectory calculation unit 50 adjusts the initial velocity or the loft angle in accordance with the power determined by the power determination unit 44, the impact determined by the impact determination unit 45, the attribute value such as physical strength set for each player's character, the lie of a ball, etc. For example, the initial velocity may be multiplied by the percentage value of the power or impact so that the initial velocity becomes faster as the power or impact becomes larger. The direction or velocity of the flying ball may also be adjusted so that the smaller the value of the impact, the farther the ball lands away from the targeted landing site. For example, when the operating input is received before the impact reaches 100 percent, the trajectory of the ball may be bent toward right producing a slice, and when the operating input is received after the impact reaches 100 percent, the trajectory may be bent toward left producing a hook. When the impact is below the predetermined lower limit, a shot may be determined to be missed, and the trajectory may be calculated with an extremely reduced initial velocity. In the case of a shot from the rough or a bunker, the initial velocity may be reduced compared to a shot from the fairway. The initial velocity may be reduced when the inclination of the contact area of the ball is large. When the player enters the operating input to change the initial velocity or loft angle, the initial velocity or loft angle may be further adjusted in consideration of the effects thereof.

After the initial velocity and the loft angle have been determined, the trajectory calculation unit 50 calculates the position of the ball frame by frame while adjusting the velocity in accordance with the power applied to the ball. The trajectory calculation unit 50 adds the velocity in units of frames to the coordinates of the current position of the ball and calculates the coordinates of the position of the ball in the subsequent frame. Gravity, aerodynamic lift, wind power, and air resistance are factored in frame by frame to the velocity of the ball. The gravitational force is specified to be 9.8 meters/second$^2$ in the downward direction in accord with the laws of physics. The aerodynamic lift is set to be a value that is proportional to the velocity in the upward direction. The wind power may be set to be a constant velocity in a given direction everywhere in the hole or may be changed in accordance with a place. The air resistance is set to be a value that is proportional to the velocity in the direction opposite to the travelling direction. As described above, by calculating the trajectory of a ball in consideration of the direction and velocity of a wind, the difficulty of making a shot can be produced in consideration of the effects of wind with the actual golfing, and a golf game that is more realistic can be realized.

When a ball hits something, the velocity in the horizontal direction and in the vertical direction are adjusted in accordance with a friction coefficient and a restitution coefficient that are set in advance according to the attributes of the surface that the ball hits. The friction coefficient and the restitution coefficient may be set to different values that vary according to the fairway, rough, bunker, etc. The trajectory calculation unit 50 may further reflect a specific computation, which is not related to the laws of physics, in the trajectory as a production effect. This introduces changes to a golf game and thus allows for the improvement of the entertainment value of the game.

The screen generation unit 66 sets the viewpoint position and the line of sight of the camera in accordance with the position of the ball calculated by the trajectory calculation unit 50 so that the ball is visible in the screen and then generates a screen that shows the flying ball and displays it on the display device 68 accordingly. The screen is changed to a next shot when the ball comes to rest.

A wind-blown object control unit 47 controls the movement of an object that moves due to the wind. When drawing a plane object included in a game screen such as a leaf fluttering down with the wind, lawn grass hovering after a shot is made on the rough, and lawn grass uprooted at the teeing ground to demonstrate the wind condition (hereinafter generically referred to as a "wind-blown object"), the behavior thereof is calculated by a physical calculation based on the direction and velocity of the wind and the direction of the surface of the wind-blown object. This allows the effect or air resistance of the wind to be expressed; thus, behavior similar to that of real behavior can be simulated.

The wind-blown object control unit 47 performs physical calculation on the assumption that the wind-blown object is a plate-like object. The flat surface of the plate is coordinated to face to a Z-axis direction, and each variable is defined as follows.

rotation angle of the plate: x, y, z
position vector of the plate: pos
velocity vector of the plate: v
velocity (constant) in the downward direction produced frame by frame: vg
velocity produced frame by frame by a wind: vw
resistance value of the surface (0.0-1.0, no resistance at 0.0): r The calculation method is as follows.

1. A matrix M is generated by adding random rotation to the rotation angles, x, y, and z, of the plate. At this time, the values may be adjusted so that a wind-blown object looks like it is whirling to the extent of being realistic.

$$x\mathrel{+}=\text{random}(\,)$$

$$y\mathrel{+}=\text{random}(\,)$$

$$z\mathrel{+}=\text{random}(\,)$$

$$M=\text{Matrix4::rotationZYX}(\text{Vector3}(X,Y,Z));$$

2. vw and vg are added to v.

$$v\mathrel{+}=vw+vg;$$

3. v is separated into two vectors, vh (parallel) and vv (perpendicular), with a component parallel to M.z (Z component of M) and a component perpendicular to M.z, respectively.

$$vh=\text{dot}(M\cdot z,v)*M\cdot z;$$

$$vv=v-vh;$$

4. vh is multiplied by a resistance value followed by adding vv and then stored in v. Since vh is a velocity component that is perpendicular to the plate, a surface resistance is expressed by multiplying vh by the resistance value.

$$v = vh * r + vv;$$

5. v is added to pos.

$$pos += v;$$

Repeating the above processes 1-5 can realistically reproduce the way a plane object flutters down with the wind.

As stated previously, in the golf game of the embodiment, the trajectory calculation unit 50 calculates the trajectory of a ball by physical calculation in consideration of effects of the wind. Thus, it is important to keep track of the direction or velocity of a wind before making a shot. In drawing a plane object that is fluttering with the wind, the direction or velocity of the wind can be accurately expressed by simulating the behavior of the object by physical calculation in consideration of the direction and velocity of the wind. This allows for the realization of a golf game that offers more reality since a player can keep track of the direction and velocity of the wind by checking the way leaves and grass flutter as in the actual golfing environment.

When the viewpoint position or the line of sight is changed by the camera control unit 42 and when a gallery character watching a player's character's play is located within a region of a predetermined distance from the viewpoint position or is located within the region of a predetermined angle from the line of sight, a gallery control unit 46 moves the gallery character outside of the predetermined region. The gallery control unit 46 acquires data that shows the land features of the hole the player's character is playing and then determines the direction to which the gallery character is moved based on the land features.

Figure 8A:
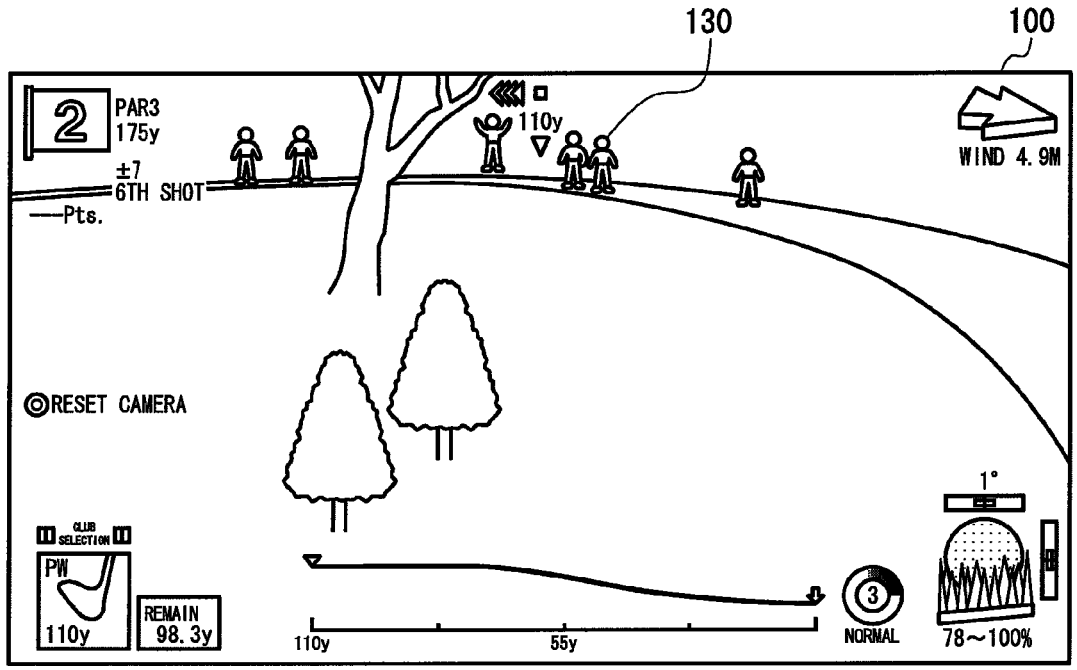
FIGS. 8A and 8B are diagrams showing example game screens displaying gallery characters.
Figure 8B:
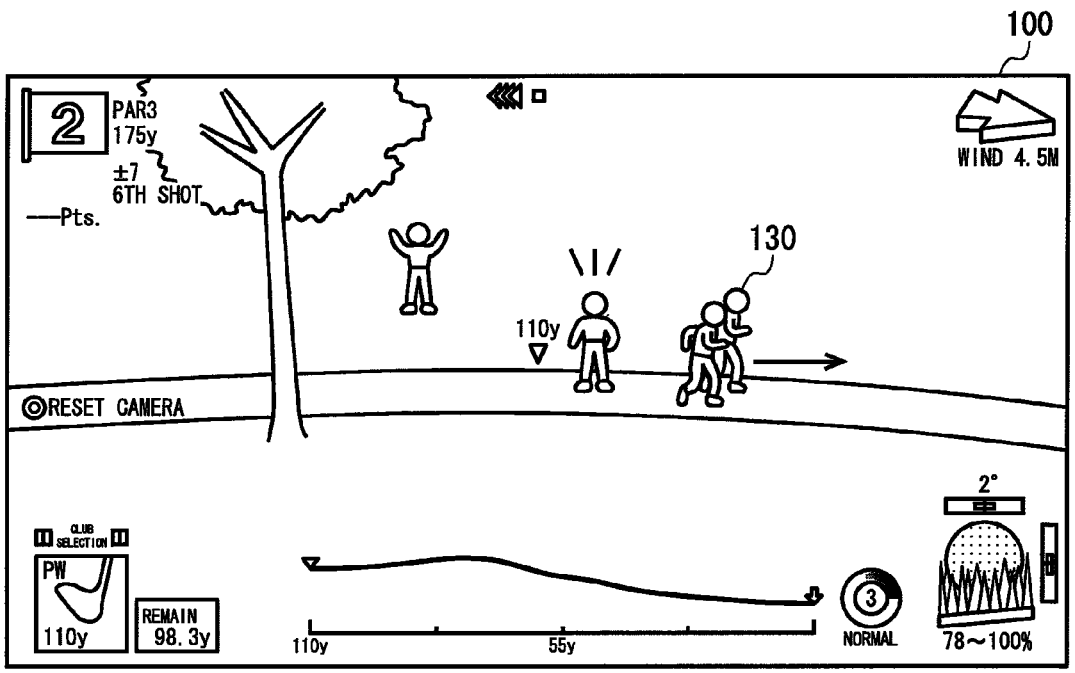

FIGS. 8A and 8B show examples of game screens in which gallery characters are displayed. The gallery control unit 46 acquires polygon data of both the observation position of the gallery character and the character itself and then ensures that the screen generation unit 66 generates a screen including a gallery character 130. As shown in FIG. 8A, when the gallery character 130 is displayed around the edge of the screen, the gallery control unit 46 may not move the gallery character 130. As shown in FIG. 8B, when the viewpoint position or the line of sight is changed in such manner that the gallery character 130 is displayed in region of a predetermined angle and distance near the center of the screen, the gallery control unit 46 moves the gallery character 130 outside of the predetermined region. As described above, a new and different enjoyment can be provided by producing a situation where the gallery notices that the direction of the gallery is being filmed with a camera or where a player's character is aiming a shot in the direction of the gallery, which quickly runs away. The gallery control unit 46 may first display the gallery character 130 becoming surprised by noticing the camera and then display the character running away. The gallery control unit 46 may control to make sure the gallery character 130 does not enter the fairway by referring to the data that shows the land features of a hole. In the example shown in FIG. 8B, the gallery character 130 is moved to right since the character will be on the fairway if it is moved to left.

A score management unit 51 manages the score of a player's character. When the player's character holes out, the score management unit 51 records the score for the hole in a parameter storing unit 60. When the player's character holes out, the score management unit 51 displays a score board after the player's character holes out until a tee shot is made in the subsequent hole.

A path acquisition unit 52 acquires both a path for a player's character who has holed out to move to a teeing ground of a subsequent hole and a path for a gallery character to move to a new observation position for the subsequent hole. A movement status display unit 53 displays the player's character and the gallery character moving along the path acquired by the path acquisition unit after the player's character holes out.

The path acquisition unit 52 may acquire the path set in advance that is stored in the storage medium 70 or may automatically determine the path by acquiring from the storage medium 70 the data that shows the land features of the hole. For example, the path acquisition unit 52 may acquire data that shows the positions of both the green of the hole where the player's character holes out and the teeing ground of the subsequent hole and may determine the path for the player's character based on the data. The path acquisition unit 52 may acquire data that shows both the current position of the gallery character and the observation position for the subsequent hole and may determine the path for the gallery character based on the data.

The path acquisition unit 52 may determine the path by acquiring the data that shows the land features of a hole and between holes, determining the ease of passing based on the land features, avoiding a difficult-to-pass place, and preferentially selecting an easy-to-pass place. For example, a bump having more than a predetermined height, a slope having more than a predetermined angle, a pond or river, a bunker, and an obstacle such as a tree may be determined to be difficult-to-pass places, and a cart path, a flat surface, etc., may be determined to be easy-to-pass places. Multiple possible routes may be set between holes according to a predetermined rule. The best easy-to-pass path may then be selected from the paths that take the routes. For example, a path may be determined by generating a directed graph including a current position, a route, and a destination, keeping a score that shows the ease of passing for each edge, and solving for the best path.

The path acquisition unit 52 may determine a path by grouping multiple characters that are located close to one another. This allows for the reduction of burden in calculating a path even when many gallery characters are placed. In the real world, galleries close to one another often move to a subsequent hole by taking the same path. Thus, the way the galleries move can be displayed more naturally.

The path acquisition unit 52 may determine a path by using a different criteria in accordance with the attributes of a character. For example, a player's character may pass through a fairway while a gallery character may be prohibited to pass the fairway. When determining the ease of passing, the path acquisition unit 52 may give a different score in accordance with the attributes of a character.

The movement status display unit 53 displays a player's character moving along the path after the player's character holes out while the score management unit 51 displays the score of the player's character in the background. The movement status display unit 53 sets the viewpoint position and the line of sight of a camera and ensures that the screen generation unit 66 generates an image viewed from the set viewpoint position to the line of sight. The movement status display unit 53 may change the viewpoint position or the line of sight. For example, the viewpoint position or the line of sight may be changed by following a character that is moving so that the character is caught in the screen. With this feature, a different form of enjoyment can be provided by an innovative production such as displaying a specific character moving between holes while the view follows the character's movement.

Figure 9:
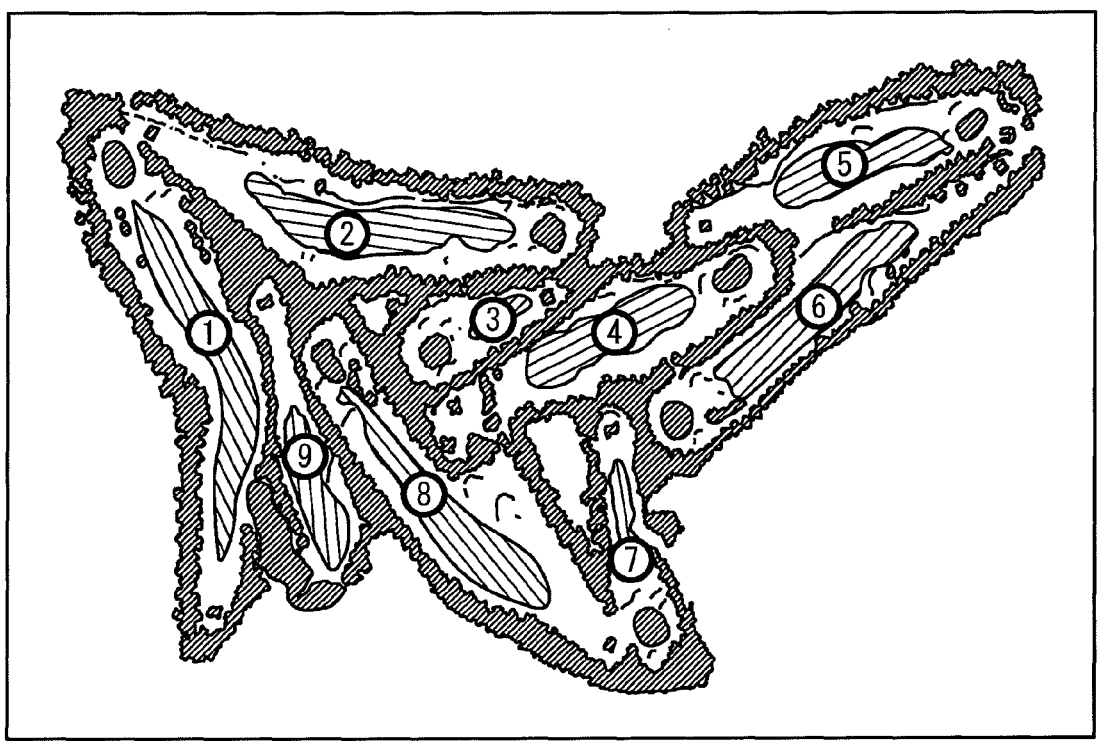
FIG. 9 is a diagram showing the layout of the holes of a golf course.

FIG. 9 shows the layout of the holes of a golf course. In the embodiment, both the data that shows the land features of each hole and the data that shows the positional relationship between holes are provided and stored in the storage medium 70. The path acquisition unit 52 acquires the data that shows the layout of a hole from the storage medium 70 and then determines the movement path of a player's character or a gallery character.

Figure 10:
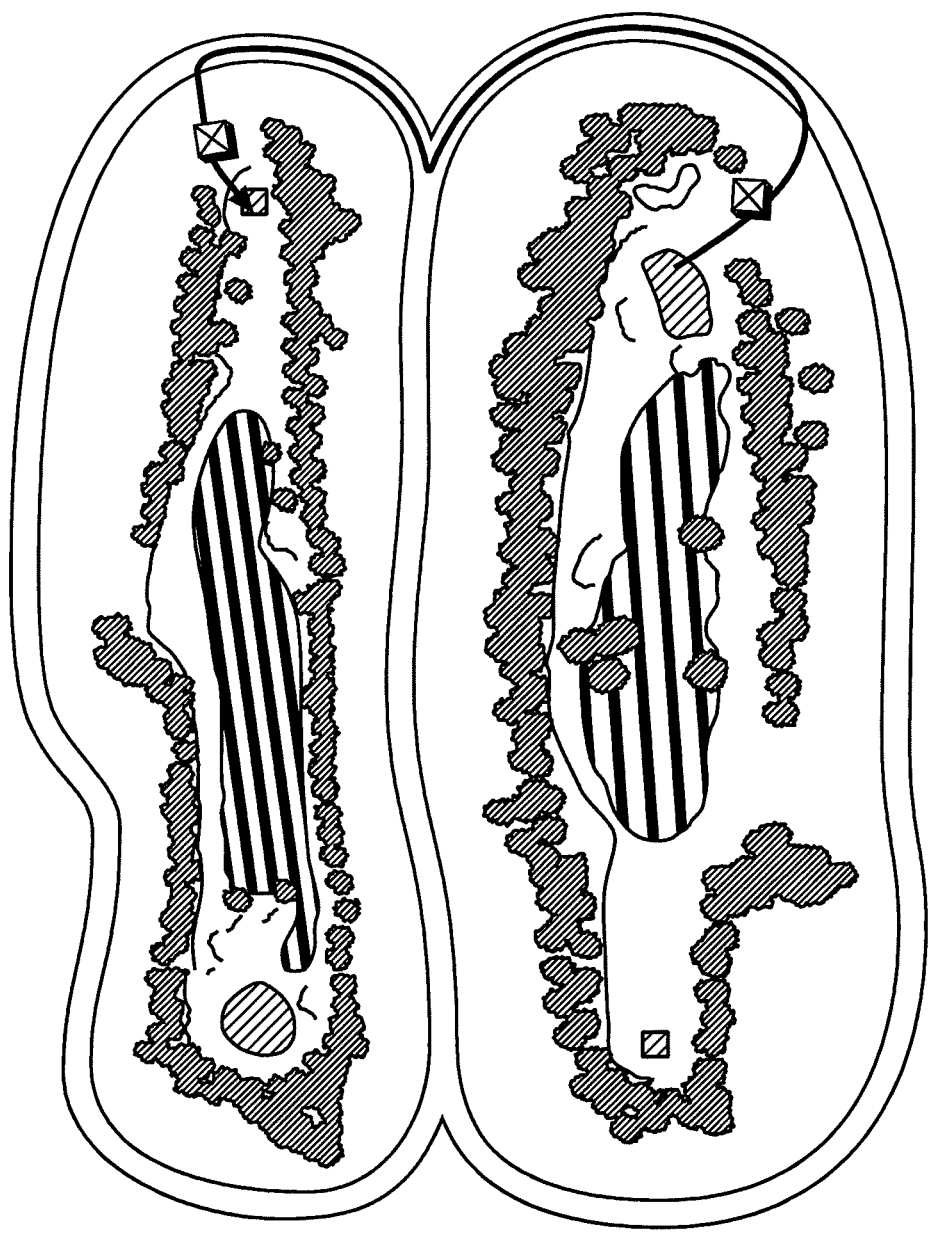
FIG. 10 is a diagram showing an example of a path of movement determined by a path acquisition unit.

FIG. 10 shows an example of a movement path determined by a path acquisition unit. The path acquisition unit 52 preferentially determines an easy-to-pass place by acquiring from the storage medium 70 the data that shows the land features of a hole and between holes and avoiding a place that makes it difficult for a character to pass.

Figure 11:
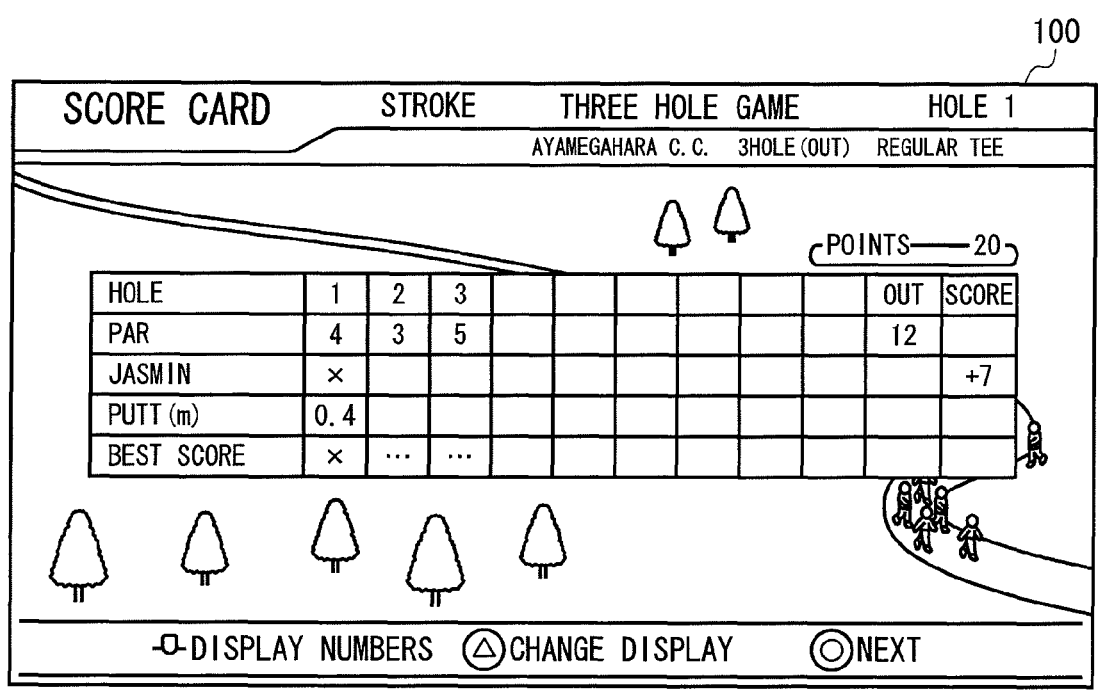
FIG. 11 is a diagram showing an example game screen in which the status of a character's movement is displayed by a movement status display unit.

FIG. 11 shows an example of a screen in which the status of a character's movement is displayed by a movement status display unit 53. The movement status display unit 53 displays a player's character and a caddie moving along a path while the score management unit 51 displays a scoreboard in the background. The player's character and the caddie talking to each other may be displayed at this time. The player's character, the caddie, the gallery characters, etc., all walking toward a green prepared only for prize-award events after the hole-out on a final hole may be displayed.

A technique of generating a screen in which areas where a drawing is carried out at a high frame rate and where a drawing is carried out at a low frame rate are mixed is described in detail in the following paragraphs. As described previously, a moving image displayed as an indicator for timing entering an operating input at the time of determining a power or determining an impact, for example, the movement of a player's character or a graphic that shrinks is displayed at a higher frame rate than the other area.

As the time interval for detecting an operating input becomes shorter, a power and an impact can be determined with a higher degree of accuracy. At the same time, a moving image used as an indicator for timing entering the operating input is preferably updated at the same rate. For example, in detecting whether the input reception unit 30 has received an operating input by interrupt processing of CPU, when the interrupt processing of CPU is performed at the rate of 60 times per second, a moving image used as an indicator is also updated at the rate of 60 frames per second, preferably.

However, when the entire screen is updated at the rate of 60 frames per second, the amount of rendering three dimensional polygon data in the screen generation unit 66 may become too large to be tracked due to the overloading of the CPU. Therefore, in the embodiment, while an image is generated at an equally high rate as the timing for detecting the operating input in the area of an indicator for the timing, the amount of rendering can be controlled by generating the other areas at a lower rate and a high-accuracy user interface can thus be realized.

An explanation is now given of an example where the drawing of an image such as those that show the land features of a hole or those of a player's character is carried out at 30 frames per second and the drawing of a moving image used as an indicator for timing is carried out at 60 frames per second. The screen generation unit 66 first acquires three dimensional data, such as the land features of a hole or a player's character, and then renders the data and generates a screen by additionally drawing a moving image used as an indicator for timing. An area where drawing is carried out at 30 frames per second is referred to as a "low-rate area" and an area where drawing is carried out at 60 frames per second is referred to as a "high-rate area" for convenience sake. The low-rate area is thus updated once every two frames of the high-rate area.

Figure 12:
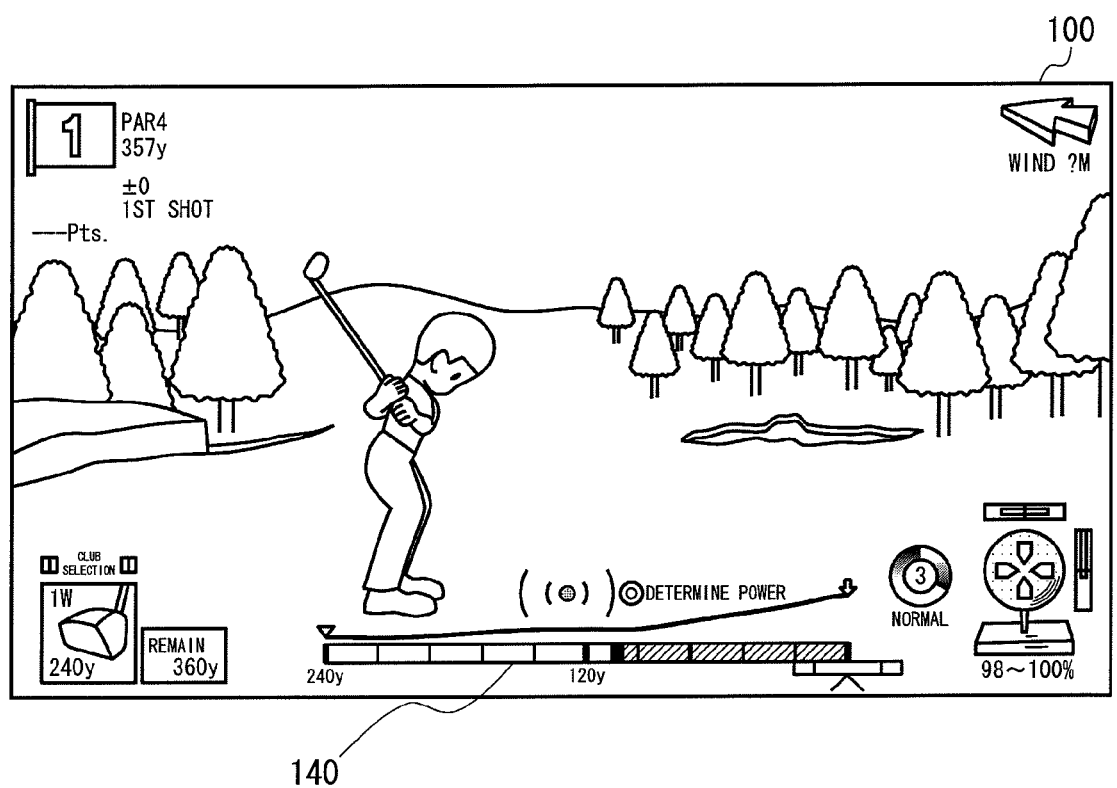
FIG. 12 is a diagram showing an example of a game screen in which areas where a drawing is carried out at a high frame rate and where a drawing is carried out at a low frame rate are mixed.

FIG. 12 shows an example screen containing areas where a drawing is carried out at a high frame rate and areas where a drawing is carried out at a low frame rate are mixed. FIG. 12 shows, as a user interface for the power determination unit 44 or the impact determination unit 45 to determine the power or the impact of a shot, an example displaying a player's character making a shot and a gauge 140 used as an indicator for determining the power or the impact. In the screen, the drawing is carried out at 30 frames per second for the movement of the shot and 60 frames per second for the movement of the gauge 140. Conventionally, an user interface is generally used in which a character stands still while the power and the impact are being determined and a moving image of the character making a shot is then displayed after the power and the impact are determined. However, according to the technique of the present embodiment, a player's character making a shot along with the gauge 140 are both displayed when determining the power and the impact, and they are both provided as indicators. Carrying out the drawing of the gauge 140 at a higher frame rate allows both the amount of burden for the rendering process to be controlled so as not to increase and a user interface with a high degree of accuracy to be provided. When needed, the player can use either one or both the movement of the character making a shot and the movement of the gauge 140 as indicators. For example, the movement of the gauge 140 should be used for an indicator with a high degree of accuracy.

Buffer memories 62a and 62b each have enough capacity to store data for one frame of a screen. The screen generation unit 66 first stores data of a generated screen of a low-rate area in any one of the multiple buffer memories 62a and 62b and copies the data to other buffer memory. The screen generation unit 66 then generates a screen where a high-rate area and a low-rate area are mixed by sequentially adding data of each generated screen of a high-rate area to respective buffer memory 62a or 62b.

Figure 13:
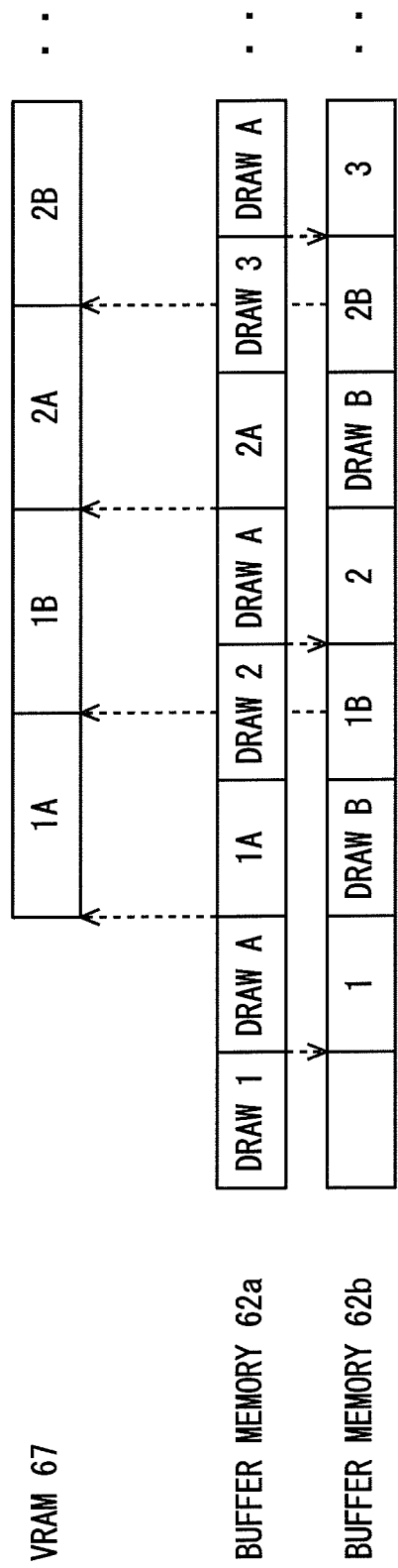
FIG. 13 is a timing chart for explaining the procedure for generating and displaying a screen by a screen generation unit.

FIG. 13 is a timing chart for explaining the procedure for generating and displaying a screen by a screen generation unit 66. After performing a drawing of a screen "1" of a low-rate area and then making a copy in the buffer memory 62b, the screen generation unit 66 additionally performs in the buffer memory 62a a drawing of a screen "A" of a first frame of a high-rate area followed by completing a screen "1A" of the first frame and forwards the screen to a VRAM 67. While the screen "1A" of the first frame stored in the buffer memory 62a is being displayed on the display device 68, a drawing of a screen "B" of a second frame of a high-rate area is additionally carried out in the buffer memory 62b. When the display of the screen "1A" of the first frame is completed, a screen "1B" of the second frame stored in the buffer memory 62b is forwarded to the VRAM 67, and the display device 68 displays accordingly. While the screen "1B" of the second frame is being displayed, a drawing of a subsequent screen "2" of a low-rate area is carried out in the buffer memory 62a in which the data for the first frame for which display is completed is stored. When the screen "1B" of the second frame is forwarded from the buffer memory 62b to the VRAM 67, the subsequent screen "2" of a low-rate area, for which the drawing is carried out in the buffer memory 62a, is copied to the buffer memory 62b. Before the display of the screen "1B" of the second frame completes, a drawing of a subsequent screen "A" of a first frame of a high-rate area is additionally carried out in the buffer memory 62a. Upon the completion of the display of the screen "1B" of the second frame, a subsequent screen "2A" of a first frame stored in the buffer memory 62a is forwarded to the VRAM 67. Repeating these processes allows for the generation and display of a screen in which a low-rate area and a high-rate area are mixed.

When the generation of a high-rate area requires a relatively large amount of time, an extra buffer memory may be provided. In this case, the screen generation unit 66 performs rendering on a screen of a low-rate area in a first buffer memory and makes a copy to a second buffer memory. Then, a drawing of a high-rate area of a first frame is additionally carried out in the first buffer memory and a drawing of a high-rate area of a second frame in additionally carried out in the second buffer memory, and both are sequentially displayed. While the screens of a first frame and a second frame are being displayed, a rendering is performed on a subsequent low-rate area in a third buffer memory. Then, upon the completion of the display for the first frame, the data of a subsequent low-rate area is copied from the third buffer memory, and a drawing of a subsequent high-rate area of a first frame is additionally carried out in the third buffer memory. This allows an additional drawing of a subsequent high-rate area to be started without waiting for all the data of the second frame to be forwarded to the VRAM 67. Thus, a screen can be generated at high-speed even when the generation of a high-rate area is time-consuming.

When generating three or more frames of a high-rate area for one frame of a low-rate area, in other words, when the frame rate of a high-rate area is three or more times that of the frame rate of a low-rate area, two buffer memories, one for storing the data of a screen of the low-rate area and one for making a copy thereof and for additionally carrying out a drawing of a screen of the high-rate area, need to be provided in advance. By alternately using the two buffer memories, after the screen of the low-rate area is copied, a drawing of the screen of the high-rate area needs to be additionally carried out so as to complete and then display the screen. For a frame of a given low-rate area, a frame for which a penultimate drawing of the high-rate area is additionally carried out may be forwarded to the VRAM 67, and the buffer memory may be then used for a drawing of the screen of a subsequent low-rate area to be carried out.

Described above is an explanation based on the embodiment of the present invention. The embodiment is intended to be illustrative only and it will be obvious to those skilled in the art that various modifications to constituting elements and processes could be developed and that such modifications are also within the scope of the present invention.

INDUSTRIAL APPLICABILITY

The present invention can be used for a game device.

The invention claimed is:

1. A game control program product embedded on a non-transitory computer-readable recording medium, comprising:
a module operative to receive first and second operating input from a player via an input device;
a module operative to control a game in which a player's character plays golf in accordance with the first and second operating input; and
a module operative to display a screen of the game on a display device, wherein
the module operative to display the screen generates a screen in which the player's character is in the backswing motion of making a shot, displays the screen as an indicator for the player to adjust his/her timing to provide the second operating input, and displays the trajectory or arrival position of a ball when the shot is made at the power at that moment in accordance with the degree of the progress of the motion of the backswing, upon receiving a first operating input from the input device to which a request to start making a shot is assigned, until receiving a second operating input from the input device to which a request to determine a power of the shot is assigned, and
the module operative to control the game determines the power of the shot in accordance with the degree of the progress of the motion of the backswing at the time of the receipt of the second operating input.

2. The game control program product according to claim 1, wherein the module operative to control the game determines the power of the shot based on the ratio between the time required for the backswing motion to reach a full swing and the time it takes from the start of the backswing until the receipt of the second operating input.

3. The game control program product according to claim 1, wherein the module operative to display the screen displays the player's character in the backswing motion at a higher frame rate than the other area.

4. The game control program product according to claim 1, wherein
the module operative to display the screen generates and then displays a screen including a graphic that shrinks with time after the power of the shot is determined, and
the module operative to control the game determines an impact of the shot in accordance with the time difference between the point when a third operating input to which a request to determine the impact of the shot is assigned is received and the point when the graphic converges toward one point.

5. The game control program product according to claim 4, wherein the module operative to display the screen displays the graphic that shrinks at a higher frame rate than the other area.

6. The game control program product according to claim 1, wherein the module operative to display the screen changes the viewpoint position or the line of sight when generating the screen in accordance with an instruction input from a player.

7. The game control program product according to claim 1, wherein the module operative to display the screen displays the trajectory or arrival position when the distance from the current position of a ball to a cup is shorter than a predetermined value.

8. The game control program product according to claim 1, wherein the module operative to display the screen displays the trajectory or arrival position in a lighter color as the distance from the current position of a ball to the arrival position becomes longer.

9. The game control program product according to claim 1, wherein the module operative to display the screen displays the trajectory or arrival position when the distance from the current position of a ball to the arrival position is shorter than a predetermined value.

10. The game control program product according to claim 1 further comprising a module operative, when the degree of the progress of the motion of making a shot reaches a predetermined value, to output a sound indicating accordingly.

11. The game control program product according to claim 10, wherein the module operative to output the sound sets a plurality of predetermined values and outputs different sounds, respectively.

12. The game control program product according to claim 1, wherein the module operative to control the game determines, when reaching the top of the swing without receiving the second operating input during backswing, the swing to be a practice swing and not to make a shot.

13. The game control program product according to claim 1 further comprising:
  a module operative to display, when the player's character is hitting a ball, the condition of a ground at the contact point where the ball rests, wherein
  the module operative to display the condition of the ground displays an object moving from the higher ground to the lower ground.

14. The game control program product according to claim 13, wherein the module operative to display the condition of the ground displays the ground as square-cut at the contact point where the ball rests and displays the object moving on the sides of the square.

15. The game control program product according to claim 1, wherein the module operative to display the screen displays an indicator that shows on the trajectory of the motion of making the shot the position when the degree of the progress of the motion of the shot reaches a predetermined value.

16. A game device comprising:
  an input reception unit operative to receive first and second operating input from a player via an input device;
  a game execution unit operative to control a game in which a player's character plays golf in accordance with the first and second operating input; and
  a screen generation unit operative to generate a screen of the game and display the screen on a display device, wherein
  the screen generation unit generates a screen in which the player's character is in the backswing motion of making a shot, displays the screen as an indicator for the player to adjust his/her timing to provide the second operating input, and displays the trajectory or arrival position of a ball when the shot is made at the power at that moment in accordance with the degree of the progress of the motion of the backswing, upon receiving a first operating input from the input device to which a request to start making a shot is assigned, until receiving a second operating input from the input device to which a request to determine a power of the shot is assigned, and
  the game execution unit determines the power of the shot in accordance with the degree of the progress of the motion of the backswing at the time of the receipt of the second operating input.

17. A game control method comprising:
  receiving first and second operating input from a player via an input device;
  controlling a game in which a player's character plays golf in accordance with the first and second operating input; and
  displaying a screen of the game on a display device, wherein
  displaying the screen generates a screen in which the player's character is in the backswing motion of making a shot, displays the screen as an indicator for the player to adjust his/her timing to provide the second operating input, and displaying the trajectory or arrival position of a ball when the shot is made at the power at that moment in accordance with the degree of the progress of the motion of the backswing, upon receiving a first operating input from the input device to which a request to start making a shot is assigned, until receiving a second operating input from the input device to which a request to determine a power of the shot is assigned, and
  controlling the game determines the power of the shot in accordance with the degree of the progress of the motion of the backswing at the time of the receipt of the second operating input.

18. A non-transitory computer-readable recording medium having recorded therein a game control computer program product comprising:
  a function of receiving first and second operating input from a player via an input device;
  a function of controlling a game in which a player's character plays golf in accordance with the first and second operating input;
  a function of displaying a screen of the game on a display device, wherein
  the function of displaying the screen generates a screen in which the player's character is in the backswing motion of making a shot, displays the screen as an indicator for the player to adjust his/her timing to provide the second operating input, and displaying the trajectory or arrival position of a ball when the shot is made at the power at that moment in accordance with the degree of the progress of the motion of the backswing, upon receiving a first operating input from the input device to which a request to start making a shot is assigned, until receiving a second operating input from the input device to which a request to determine a power of the shot is assigned, and
  the function of controlling the game determines the power of the shot in accordance with the degree of the progress of the motion of the backswing at the time of the receipt of the second operating input.

* * * * *